United States Patent [19]
Stridh et al.

[11] Patent Number: 6,022,407
[45] Date of Patent: Feb. 8, 2000

[54] CONCRETE MIXTURE WHICH YIELDS CONCRETE HAVING HIGH STRENGTH AT VARYING DENSITY, METHOD FOR PRODUCING THE MIXTURE AND THE CONCRETE, AND USE OF AN ANIONIC ADDITIVE

[75] Inventors: Kjell Stridh, Stenungsund; Ingemar Johansson, Ange; Kjell Svedman, Ange; Marita Naslund, Ange, all of Sweden

[73] Assignees: Akzo Nobel Surface Chemistry AB, Stenungsund; Senad Teknikbetong AB, Ange, both of Sweden

[21] Appl. No.: 09/171,395

[22] PCT Filed: Apr. 4, 1997

[86] PCT No.: PCT/EP97/01682

§ 371 Date: Feb. 4, 1998

§ 102(e) Date: Feb. 4, 1998

[87] PCT Pub. No.: WO97/39992

PCT Pub. Date: Oct. 30, 1997

[30] Foreign Application Priority Data

Apr. 18, 1996 [SE] Sweden .................................... 960147

[51] Int. Cl.[7] ........................... C04B 38/00; C04B 24/16
[52] U.S. Cl. ......................... 106/678; 106/725; 106/809; 106/823
[58] Field of Search .................................... 106/678, 725, 106/809, 823

[56] References Cited

U.S. PATENT DOCUMENTS

| | | | |
|---|---|---|---|
| 3,468,684 | 9/1969 | Proell | 106/95 |
| 3,577,248 | 5/1971 | Doan | 106/678 |
| 4,045,236 | 8/1977 | Bianchi | 106/678 |
| 4,057,608 | 11/1977 | Hashimoto et al. | 264/42 |
| 4,113,638 | 9/1978 | Taylor | 252/61 |

FOREIGN PATENT DOCUMENTS

| | | | |
|---|---|---|---|
| 628725 | 10/1961 | Canada | 106/678 |
| 1 054 701 | 2/1954 | France . | |
| 2 322 112 | 3/1977 | France | C04B 31/30 |
| 2 354 298 | 1/1978 | France | C04B 13/26 |
| 57-27861 | 6/1982 | Japan | 106/678 |
| 717766 | 11/1954 | United Kingdom . | |

OTHER PUBLICATIONS

*International Search Report*, dated Aug. 22, 1997.
*Chemical abstract, No. 107066k, Cement Concrete (58)*, vol. 106, No. 14, p. 315, Jul. 23, 1986.
*Chemical abstract, No. 165873y*, vol. 98, No. 20, p. 312, Oct. 7, 1982.

*Primary Examiner*—Anthony Green
*Attorney, Agent, or Firm*—Ralph J. Mancini; Lainie E. Parker

[57] ABSTRACT

An aqueous concrete mixture having an air pore volume between 10 and 85%, preferably between 20 and 85%. When the aqueous concrete mixture is cured, a concrete having uniform density and high strength is obtained. This is achieved by including in the concrete mixture an aqueous, anionic surface-active compound containing two sulphonic acid groups of the general formula $$(R)_m\text{—}R_1\text{—}(SO_3M)_2 \qquad (1)$$

wherein R is an aliphatic group having 4–20 carbon atoms, m is a number 1 or 2, the sum of the number of carbon atoms in the 1 or 2 R groups being 6–30, $R_1$ is an aromatic group containing at least 2 aromatic rings and 10–20 carbon atoms, and M is a cation or hydrogen. The anionic compound has an air-entraining effect and improves the homogeneity of the concrete mixture.

19 Claims, No Drawings

CONCRETE MIXTURE WHICH YIELDS CONCRETE HAVING HIGH STRENGTH AT VARYING DENSITY, METHOD FOR PRODUCING THE MIXTURE AND THE CONCRETE, AND USE OF AN ANIONIC ADDITIVE

The present invention relates to an aqueous concrete mixture having an air pore volume between 10 and 85%, preferably between 20 and 85%. In curing, a concrete having uniform density and high strength is obtained. This is achieved by using an aqueous, anionic surface-active compound containing two sulphonic acid groups or a salt thereof. The anionic compound has an air-entraining effect and improves the homogeneity of the concrete mixture.

When making concrete, especially aerated concrete with low density, for instance lower than 1600 kg/m$^3$, it is difficult to obtain high homogeneity and uniform density and low shrinkage and, thus, high and reproducible strength. Attempts have therefore been made to improve the stability of the mixture as well as air pore formation and strength of the cured concrete mixture by adding, among other things, anionic surfactants, such as xylenesulphonate, alkyl sulphate, alkyl ether sulphate and olefin sulphonate, and polymeric sulphonic-acid-group-containing compounds such as lignosulphonate, naphthalene sulphonate formaldehyde condensate and melamine sulphonateformaldehyde condensate. These compounds have a dispersing and stabilising effect and increase the processability of the concrete mixture. The short-chain surface-active compounds have a particularly good effect on the formation of air pores and thus affect also the frost resistance of the concrete. The polymeric compounds affect first of all the stability, pumpability and flexibility (plasticity) of the concrete mixture and make it possible to reduce the water-cement ratio. Examples of this technique are disclosed in, for instance, WO 94/02428, U.S. Pat. No. 4,045,236, U.S. Pat. No. 4,293,341 and GB-A-2,164,328.

From Japanese Patent Application JP 61-163,155 it is also known to manufacture concrete having a density of about 2400 and an air pore volume of about 2% by adding to the concrete mixture alkyl polyoxypropylene sulphate or alkyl diphenylethersulphonate, preferably together with a salt of a condensate of β-naphthalenesulphonic acid with formaldehyde, a sulphonate of a condensate between melamine with formaldehyde, a salt of a condensate of sulphonated creosote oil with formaldehyde or a lignin sulphonate and co-condensates thereof, for the purpose of improving the appearance of the surfaces of the concrete.

Even if some of the above-mentioned air-entraining additives have a positive effect on the strength of the concrete at low densities, there is a general wish of further increasing the homogeneity of the concrete and, thus, its strength, especially at lower densities.

It has now surprisingly been found that concrete having a density of 250–2200 kg/m$^3$ and an air pore volume from 15 to 90%, preferably from 20 to 85% and high strength, especially at low densities can be obtained by casting it from a pumpable, aqueous concrete mixture having an air pore volume of 10–85 volume percent, which contains cement, water and an anionic surface-active compound having two sulphonic acid groups of the general formula

$$(R)_m\text{—}R_1\text{—}(SO_3M)_2 \qquad (I)$$

wherein R is an aliphatic group having 4–20 carbon atoms, m is a number 1 or 2, the sum of the number of carbon atoms in the group or in the groups R being 6–30, $R_1$ is an aromatic group containing at least 2 aromatic rings and 10–20 carbon atoms, and M is a preferably monovalent cation or hydrogen. Usually the group $R_1$ contains only carbon and hydrogen, but oxygen atoms, for example in the form of ketone groups, can also be included. The concrete mixture may also contain aggregate to control the density, or as filler. The anionic compound has both an air-entraining and a stabilising effect and is usually added in an amount of 0.005 to 1.0% based on the weight of cement. When manufacturing concrete having low densities, such as densities below 1600 kg/m$^3$ but usually above 300 kg/m$^3$, which generally corresponds to an air pore volume of 25–85 volume percent, the anionic compound is usually added in an amount of 0.1–0.8%, based on the amount of cement. Use can advantageously also be made of the anionic compound when manufacturing concrete having higher densities than 1600, for example up to 2200 kg/m$^3$. At the higher densities, it may become necessary to add aggregate materials such as sand and gravel. Also, old building material, e.g. in the form of ground concrete, can advantageously be incorporated in the concrete mixture according to the invention.

Since the inventive concrete also has exceptionally high strength and stability when casting on various bases such as saw dust, sand and water, and high reproducibility, it is very well suited to make light concrete constructions without necessarily reducing the volume of the construction. The aerated concrete can also be used for ground and road building and as light filling to reduce or eliminate settlements, improve the stability or reduce the horizontal pressure exerted on structural supports. The aerated concrete can also be used as filling around conduits, when refilling conduit ditches and cavities.

According to the invention, the aqueous concrete mixture can be produced by mixing, during agitation, a main mixture containing the greater part of cement, the greater part of water and, optionally, aggregate, and a supplementary mixture containing water, cement and the anionic compound and other organic additives. The weight ratio of main mixture to supplementary mixture usually is in the range 20:1 to 2:1.

Another convenient method of producing aerated concrete according to the invention having a density below 1600 kg/m$^3$, preferably below 800 kg/m$^3$, is to add, in a discontinuous or continuous concrete mixer, water, an anionic surfactant according to the invention and, optionally, resin included and other organic additives and a small amount of cement included, usually 2–40, preferably 5–30% by weight of the total amount of cement (suitably in the stated sequence). The resulting composition is stirred during increase in volume to a homogeneous, stable air-containing concrete mixture, whereupon the remaining cement is added in one or more steps or continuously and is admixed during agitation. The fluid, pumpable aerated concrete mixture is then ready to be poured.

A further method that is suitable for producing aerated concrete containing aggregate is first to mix water, the anionic surface-active compound and, optionally, other organic additives and then add the resulting fluid mixture to a mixture of cement and aggregate during agitation which yields high frictional forces between the aggregate grains, which facilitates the formation of a homogeneous fluid concrete mixture. The density of concrete produced according to this method is usually above 800 kg/m$^3$, and preferably between 1200 and 2100 kg/m$^3$.

The aqueous, finished concrete mixture, ready to be poured, usually contains per 100 parts by weight of cement, 30–80 parts by weight of water and 0.005–1 parts by weight of the anionic surface-active compound. In the alternative, the concrete mixture can contain 40–80 parts by weight of water. The amount of aggregate is determined by the density required for the cast concrete and usually is in the range 0–5 parts by weight/part by weight of cement. When producing the aqueous concrete mixture, also other additives than the anionic surface-active compound can be added, such as other air-entraining additives, for instance different kinds of resin; other types of anionic surface-active compounds, for example compounds of formula I, II, III, IV and V, which have only one sulphonate group; and nonionic compounds, for instance ethylene oxide adducts; hydrophobising additives; solubilising compounds, e.g. ethylene glycols and its mono- or dimethyl or ethylethers having a molecular weight of up to 300; and water-retaining and plasticity-increasing additives (plasticisers), e.g. non-ionic cellulose ethers and polyalkylene glycols having molecular weights above 400.

The anionic compound (I) suitably consists of compounds, wherein R is an aliphatic group having 6–14 carbon atoms and $R_1$ is an aromatic group having 10–17 carbon atoms and two aromatic rings. Examples of such anionic compounds are those having the formulae

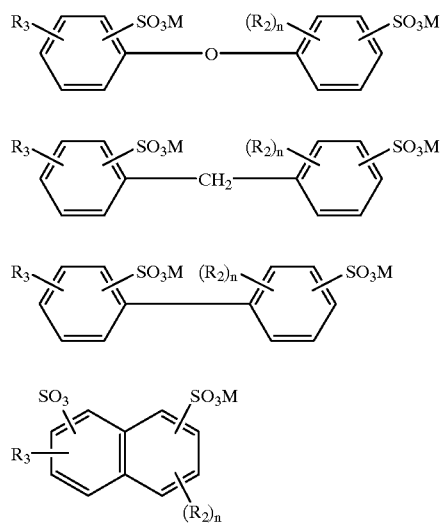

wherein $R_3$ is an aliphatic group having 4–20 carbon atoms, M has the above meaning, $R_2$ is an aliphatic group having 1–14 carbon atoms and n is 0 or 1, preferably 0. The groups $R_3$ and $R_2$ are, for instance, a butyl group, a hexyl group, an octyl group, a decyl group or a dodecyl group, which can be straight or branched. Moreover, the group $R_2$ can suitably be a lower alkyl group, such as a methyl or ethyl group. The sum of the number of carbon atoms in the groups $R_3$ and $R_2$ is preferably from 8 to 24.

The compounds according to the invention can suitably be prepared by reacting, in a first step, the aromatic, unsulphonated core having the formula $R_1R_{2+m}$, wherein $R_1$ has the meaning stated in formula I, with a compound, RCl or RCOCl, wherein R has the above meaning, or with an alkene having 4–20 carbon atoms. The resulting reaction product $(R)_mR_1H_2$ can then in a manner known per se be sulphonated, optionally in the presence of a solubiliser, such as dimethyl ether or diethyl ether of polyethylene glycol having a molecular weight of up to 300. Normally, the sulphonation can be carried out, without great difficulty, to an average sulphonation number of about 1.5–1.95. Practical experiments have shown that the small part consisting of monosulphonated products need not be separated from the disulphonated products, but the resulting product mixture can be used without reprocessing provided that the average sulphonation number is at least 1.5.

Cement is a hydraulic binder, which by the adding of water forms a paste and cures by hydration. The curing depends first of all on the formation of calcium silicate hydrate. The most important silicate-cement-containing composition is Portland cement clinker. When applying the invention, use is preferably made of Portland cement owing to its good all-round properties. It contains, among other things, tricalcium silicate, dicalcium silicate, tricalcium aluminate and calcium aluminium ferrite. Other examples of suitable types of cement are Portland blast-furnace cement, Portland fly-ash cement, Portland pozzolana cement, coloured Portland cement, white Portland cement, low-heat Portland cement and rapid-hardening Portland cement, which are all based on Portland cement clinker.

The addition of synthetic or natural resins and derivatives thereof having molecular weights of usually below 10,000 and a saponification number of 100–250 contributes, especially at lower densities, i.e. 300–1600 kg/m², preferably 300–1200 kg/m², to a further increase of the strength, water-repellent properties and homogeneity of the concrete. The addition of the resins will also make the cellwall structure more dense and reduce the formation of channels between the cells (pores). It is even possible to produce hardened concrete, which can withstand or essentially reduce water and air entrainment by adding a readily dispersable resin of the type defined above in a sufficient amount. The resins and their derivatives may contain one or more aromatic and/or aliphatic groups having at least 12, preferably 16–35 carbon atoms. The groups can be saturated as well as unsaturated. Preferred resins are such having an acid number from 4 to 170 and a saponification number from 150 to 175. Examples of suitable resins are various resin acids and mixtures thereof, such as colophonium, and their dimerised derivatives and wholly or partly saponified, esterified and/ or hydrated derivatives thereof. Examples of suitable hydroxyl compounds for esterification are methanol, glycol, glycerol and pentaerythritol. Other Examples are modified colophonium resins modified with unsaturated fatty acids, such as maleic acid and maleic acid anhydride, and their preferably partially esterified derivatives and phenol-modified colophonium. Examples of suitable phenols are 4-tert-butyl phenol, nonyl phenol and 4,4'-diphenylolpropane (bisphenol A).

There exsists a large number of commercially available synthetic or natural resins and derrivates for use according to the present invention. Such resins and derivates are for example Aquatac 6085-B1, Snowtac SE 380 G, Rondis DRS 70 S, Rondis DRS 80 P, Dynakoll VS50FS, Beviros 95, Peramin L and Vinsol NVX. The amount of resin added to the concrete mixture according to the invention usually is 0–250%, preferably 10–200% of the weight of the disulphonate.

The present invention is further illustrated by the following Examples.

EXAMPLES

In the following tests, use was made of the following anionic surface-active compounds.

| Designation | Compound | Active content anionic substance % |
|---|---|---|
| a | Dodecylbenzenesulphonate | 23.5 |
| b | Lignosulphonate | — |
| c | Dodecylsulphate | 30 |
| d | Naphthalenedisulphonate | |
| e | Formula II, n = 0.13; $R_3 = R_2$ = dodecyl; sulphonation number 1.85 | 45 |
| f | Formula II, n = 0.13; $R_3 = R_2$ = decyl; sulphonation number 1.85 | 45 |

-continued

| Designation | Compound | Active content anionic substance % |
|---|---|---|
| g | Formula II, n = 0.13; $R_3 = R_2$ = decyl; sulphonation number 1.85; triethylene glycol dimethyl ether 18.4% | 36.7 |
| h | Formula V, n = 0; $R_3$ = decyl sulphonation number 1.8 | 45 |
| i | Formula IV, n = 0; $R_3$ = decyl sulphonation number 1.75 | 41 |
| j | Formula III, n = 0; $R_3$ = decyl sulphonation number 2.0 | 44.5 |

Moreover, the following aggregate materials and resins were used in the tests.

| Designation | Product |
|---|---|
| k | Aquatac 6085-B1, a glycerol resin acid ester supplied by Bergvik Kemi AB, having an active content of 59% by weight |
| l | Vinsol resin, 17% active content (Peramin L, Perstorp AB) |
| m | Sand having a grain size of <1 mm |
| n | Calcium silicate (Merit) |
| o | Sand having a grain size of <4 mm |
| p | Sand having a grain size of <8 mm |
| q | Sand 70/30 mixture of o and p above |
| r | Sand having a grain size of <32 mm |

Example 1

For producing aerated concrete having a wet density in the range of about 400–1000 kg/m³, the following procedure took place. Water, an anionic surface-active compound, resin and 17% of the total amount of Portland cement according to Table I were supplied in a cylindrical mixer having a volume of about 200 l. The components were stirred at a speed of 250 rpm for 30 s and resulted in an aerated concrete mixture having a volume of about 130 l. Then the remaining amount of Portland cement was added continuously within 70 s during agitation at a speed of 110 rpm. The agitation continued for further 320 s. The fluid pumpable concrete mixture was then poured into moulds for various tests, whereupon the concrete was allowed to cure at room temperature.

TABLE 1

| | Surfactant | | Water | Cement | Resin | | Aggregate | |
|---|---|---|---|---|---|---|---|---|
| Test | Type | Weight content | weight content | weight content | Type | Weight content | Type | Weight content |
| A | a | 5.44 | 200 | 286 | — | | — | |
| B | a | 5.44 | 200 | 286 | k | 2.10 | — | |
| C | b | 1.22 | 200 | 286 | — | | — | |
| D | c | 4.06 | 200 | 286 | k | 0.7 | — | |
| E | d | 1.22 | 200 | 286 | — | | — | |
| 1 | e | 2.71 | 200 | 286 | k | 0.70 | — | |
| 2 | f | 2.71 | 200 | 286 | k | 0.70 | — | |
| 3 | f | 2.71 | 200 | 286 | k | 2.10 | — | |
| 4 | f | 2.60 | 200 | 286 | — | | — | |
| 5 | e | 2.00 | 200 | 286 | — | | — | |
| 6 | f | 1.62 | 200 | 286 | k | 0.70 | — | |
| 7 | g | 2.96 | 200 | 286 | k | 0.70 | — | |
| 8 | f | 1.62 | 200 | 286 | l | 0.52 | — | |
| | | | | | k | 0.53 | | |
| 9 | f | 1.95 | 163 | 214 | k | 0.53 | — | |
| 10 | g | 1.17 | 163 | 214 | k | 0.53 | — | |
| | | | | | l | 0.78 | | |
| 11 | f | 2.70 | 222 | 360 | k | 0.70 | m | 200 |
| 12 | f | 2.70 | 229 | 340 | k | 0.70 | n | 185 |
| 13 | f | 3.24 | 257 | 463 | k | 0.84 | m | 240 |
| 14 | f | 3.24 | 257 | 463 | k | 0.84 | n | 240 |

The wet density of the concrete mixture and the dry density of the concrete were determined, as well as compressive strength after 28 days according to SS 137126 with 5 mm depth of impression unless otherwise stated, the wet and dry air volume contents and the average pore diameter in cured state. The following results were obtained.

TABLE 2

| | Density, kg/m³ | | Air pore volume % | | Compressive strength, | Pore diameter, |
|---|---|---|---|---|---|---|
| Test | Wet | Dry | Wet | Dry | MPa | mm |
| A | No foaming | | | | | |
| B | No foaming | | | | | |
| C | No foaming | | | | | |
| D | No foaming | | | | | |
| E | No foaming | | | | | |
| 1 | 473 | 349 | 72 | 81 | 2.80 | 1.5 |
| 2 | 485 | 358 | 71 | 80 | 3.00 | 1.2 |
| 3 | 502 | 371 | 70 | 80 | 3.18 | 2.0 |
| 4 | 470 | 346 | 72 | 81 | 2.06 | 1.5 |
| 5 | 445 | 328 | 73 | 82 | 1.11 | 1.5 |
| 6 | 536 | 395 | 68 | 78 | 3.31 | 1.2 |

TABLE 2-continued

| Test | Density, kg/m³ Wet | Density, kg/m³ Dry | Air pore volume % Wet | Air pore volume % Dry | Compressive strength, MPa | Pore diameter, mm |
|---|---|---|---|---|---|---|
| 7 | 470 | 347 | 72 | 81 | 2.67 | 1.5 |
| 8 | 466 | 343 | 72 | 81 | 1.74 | 1.5 |
| 9 | 430 | 306 | 74 | 83 | 0.87 | 1.5 |
| 10 | 427 | 304 | 74 | 83 | 0.96 | 1.5 |
| 11 | 808 | 672 | 57 | 68 | 12.7[1) | 1.5 |
| 12 | 815 | 660 | 56 | 68 | 24.6[1) | 1.5 |
| 13 | 944 | 806 | 51 | 62 | 23.6[1) | 1.0 |
| 14 | 985 | 841 | 49 | 61 | 41.2[1) | 0.8 |

[1)25 mm impression

As appears from the result, concrete produced according to the invention yielded concrete having great air pore Volumes and high strength. The concrete mixture, produced with additives outside the invention according to Tests A–E, could not be foamed and stabilised.

Example 2

Fluid concrete mixtures were prepared in the same way as in Example 1, except that the ingredients and 30% of the Portland cement were mixed in a laboratory mixer having a volume of about 60 l and a speed of 470 rpm for 45 s. The remaining amount of Portland cement was then added for 45 s at 300 rpm followed by further agitation for 345 s at the abovementioned speed. The concrete mixtures were composed as follows.

TABLE 3

| Test | Surfactant Type | Surfactant Weight content | Water weight content | Cement weight content | Resin Type | Resin Weight content |
|---|---|---|---|---|---|---|
| 1 | h | 2.40 | 200 | 286 | | — |
| 2 | f | 2.70 | 200 | 286 | | — |
| 3 | h | 2.40 | 200 | 286 | k | 0.70 |
| 4 | i | 2.70 | 200 | 286 | | — |
| 5 | i | 2.70 | 200 | 286 | k | 0.70 |
| 6 | f | 2.70 | 200 | 286 | k | 0.70 |
| 7 | j | 2.60 | 200 | 286 | k | 0.70 |

The resulting concrete mixture and the properties of the cured concrete were determined in the same way as in Example 1. The following results were obtained.

| Test | Density, kg/m³ Wet | Density, kg/m³ Dry | Air pore volume % Wet | Air pore volume % Dry | Strength, MPa | Pore diameter, mm |
|---|---|---|---|---|---|---|
| 1 | 416 | 307 | 0.75 | 0.83 | 0.86 | 1.0 |
| 2 | 424 | 313 | 0.75 | 0.83 | 0.89 | 1.5 |
| 3 | 438 | 323 | 0.74 | 0.82 | 0.96 | 1.2 |
| 4 | 451 | 332 | 0.73 | 0.82 | 0.86 | 0.8 |
| 5 | 474 | 350 | 0.72 | 0.81 | 1.40 | 1.0 |
| 6 | 486 | 358 | 0.71 | 0.80 | 1.78 | 1.5 |
| 7 | 660 | 487 | 0.60 | 0.73 | 5.96 | 1.5 |

As appears from the results, aerated concrete having dry densities of about 300 kg/m³ could be produced with satisfactory strength. The presence of resin resulted in a higher density and a correspondingly higher strength.

Example 3

Aerated concrete containing aggregate was produced by mixing in an open-pan mixer having a volume of 150 l Portland cement and aggregate material and then adding a liquid mixture containing an anionic surface-active compound and resin according to Table 4 at a speed of 41 rpm for 7 min. However, in one of the tests use was made of a free-fall mixer having a volume of 3000 l, the mixing taking place for 3 min at a speed of 10 rpm.

TABLE 4

| Test | Surfactant Type | Surfactant Weight content | Water weight content | Cement weight content | Resin Type | Resin Weight content | Aggregate Type | Aggregate Weight content |
|---|---|---|---|---|---|---|---|---|
| A | b | 1.00 | 175 | 420 | | — | o | 1000 |
| 1 | f | 3.73 | 253 | 506 | | — | p | 655 |
| 2 | f | 3.62 | 245 | 490 | | — | p | 859 |
| 3 | f | 0.06 | 220 | 20 | | — | q | 1410 |
| 4 | f | 0.12 | 210 | 420 | k | 0.06 | g | 1410 |
| 5 | f | 0.15 | 173 | 322 | | — | r | 1674 |

The resulting concrete mixture and the properties of the cured concrete were determined according to cube strength SS 137210, while the remaining properties were determined in the same way as in Example 1. The following results were obtained.

TABLE 5

| Test | Density, kg/m³ Wet | Density, kg/m³ Dry | Air pore volume % Wet | Air pore volume % Dry | Cube strength, MPa | Pore diameter, mm |
|---|---|---|---|---|---|---|
| A | No foaming | | | | | |
| 1 | 1420 | 1290 | 34 | 45 | 7.5 | 0.2 |
| 2 | 1600 | 1474 | 27 | 38 | 11.5 | 0.2 |
| 3 | 1970 | 1859 | 11 | 21 | 19.5[1) | 0.2 |
| 4 | 2035 | 1930 | 12 | 21 | 26.0 | 0.2 |
| 5 | 2170 | 2077 | 15 | 22 | 30.2 | 0.2 |

[1)7-day value

As appears from the results, the concrete mixtures 1–5 according to the invention foamed and yielded a cured aerated concrete having high strength.

We claim:
1. A pumpable aqueous concrete mixture having an air pore volume of 10–85 volume percent comprising water, cement and an anionic surface-active compound, the concrete mixture having a water to cement ratio from 0.40 to 0.80 and the anionic surface-active compound being a compound of the formula $$(R)_m-R_1-(SO_3M)_2 \qquad (1)$$

wherein R is an aliphatic group having 4–20 carbon atoms, m is a number 1 or 2, the sum of the number of carbon atoms in the 1 or 2 R groups being 6–30, $R_1$ is an aromatic group containing at least 2 aromatic rings and 10–20 carbon atoms, and M is a cation or hydrogen.

2. The concrete mixture according to claim 1, wherein R has 6–14 carbon atoms, $R_1$ has 10–17 carbon atoms and two aromatic rings, and the concrete mixture has an air pore volume of 20–85 volume percent.

3. The concrete mixture according to claim 1, wherein the anionic compound has one of the following formulae wherein $R_3$ is an aliphatic group having 4–20 carbon atoms, M is a cation or hydrogen, $R_2$ is an aliphatic group having 1–14 carbon atoms, and n is 0 or 1.

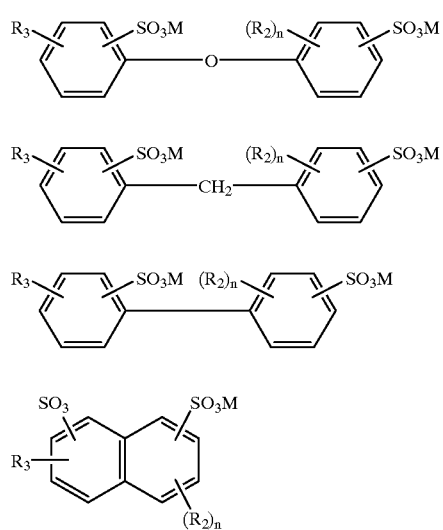

4. The concrete mixture according to claim 1, which comprises: 100 parts by weight of cement, 0.005–1 parts by weight of the anionic compound, 40–80 parts by weight of water, 0–500 parts by weight of aggregate, and 0–250% by weight, based on the weight of the anionic compound of a resin having a molecular weight below 10,000 and a saponification number of 100–250.

5. The concrete mixture according to claim 3 wherein the anionic compound has the formula (II)

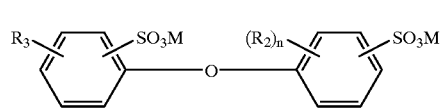

wherein $R_3$ is an aliphatic group having 4–20 carbon atoms, M is a cation or hydrogen, $R_2$ is an aliphatic group having 1–14 carbon atoms, and n is 0 or 1.

6. Concrete having a density of 250–2200 kg/m³ and an air pore volume of 15–90% which is obtained by curing a concrete mixture according to claim 1.

7. The concrete according to claim 6, wherein the concrete has a density of 300–1600 kg/m³, and further comprises a resin having a molecular weight below 10,000 and a saponification number of 100–250, the resin comprising 10–200% by weight of the anionic compound.

8. A method for producing concrete having an air pore volume of 15–90 volume percent and a water to cement ratio of from 0.40 to 0.80, which comprises adding to cement an anionic compound of the general formula $$(R)_m-R_1-(SO_3M)_2 \qquad (1)$$

wherein R is an aliphatic group having 4–20 carbon atoms, m is a number 1 or 2, the sum of the number of carbon atoms in the 1 or 2 R groups being 6–30, $R_1$ is an aromatic group containing at least 2 aromatic rings and 10–20 carbon atoms, and M is a cation or hydrogen.

9. The method according to claim 8 wherein the anionic compound has the formulae

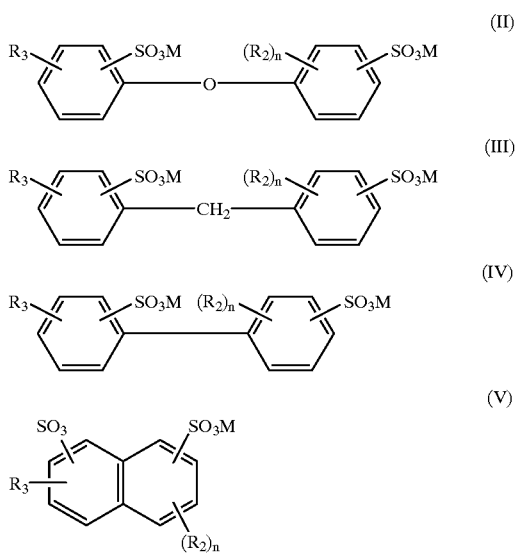

wherein $R_3$ is an aliphatic group having 4–20 carbon atoms, M is a cation or hydrogen, $R_2$ is an aliphatic group having 1–14 carbon atoms, and n is 0 or 1.

10. The method of claim 9, wherein the concrete has a density from 300 to 1600 kg/m³, and the anionic compound has the formula II.

11. The method of claim 8, further comprising adding to cement a resin having a molecular weight below 10,000 and a saponification number of 100–250, the amount of resin being 10–200% by weight of the anionic compound.

12. The method of claim 8, wherein the anionic compound is present in an amount of 0.005–1% by weight, based on the weight of cement.

13. The method of claim 12, wherein the anionic compound is present in an amount of 0.1–0.8% by weight, based on the weight of cement.

14. A method for producing a pumpable aqueous concrete mixture having an air pore volume of 10–85 volume percent, which comprises performing the following steps in a concrete mixer:

a. introducing water, an anionic surface-active compound of the general formula $$(R)_m-R_1-(SO_3M)_2 \qquad (I)$$

wherein R is an aliphatic group having 4–20 carbon atoms, m is a number 1 or 2, the sum of the number of carbon atoms in the 1 or 2 R groups being 6–30, $R_1$ is an aromatic group containing at least 2 aromatic rings and 10–20 carbon atoms, and M is a cation or hydrogen, a first portion of cement in an amount of 2–40% by weight of a sum of a first and second portion of cement, and, optionally, organic additives to form a concrete mixture.

b. agitating the mixture while entraining air thereto, and c. then adding in one or more steps or continuously during agitation the second portion of cement, the water to cement weight ratio being from 0.40 to 0.80.

15. The method of claim 14, wherein the anionic compound is present in an amount of 0.005–1 % by weight, based on the weight of cement.

16. The method of claim 15, wherein the anionic compound is present in an amount of 0.1–0.8% by weight, based on the weight of cement.

17. A method for producing concrete having an air pore content of 15–90 volume percent, comprising casting the pumpable, aqueous concrete mixture produced according to the method of claim 12.

18. A method for producing concrete having an air pore content of 15–90 volume percent, comprising casting the pumpable, aqueous concrete mixture according to claim 1, wherein the anionic compound is present in an amount of 0.005–1% by weight, based on the weight of cement and said anionic compound is one of the formulae:

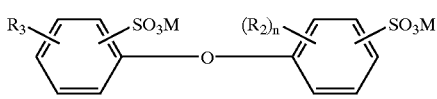

(II)

-continued (III)

(IV)

(V)

wherein $R_3$ is an aliphatic group having 4–20 carbon atoms, M is a cation or hydrogen, $R_2$ is an aliphatic group having 1–14 carbon atoms, and n is 0 or 1.

19. The method of claim 18, wherein the anionic compound is present in an amount of 0.1–0.8% by weight, based on the weight of cement.

* * * * *